(12) United States Patent
Darbari et al.

(10) Patent No.: US 9,767,236 B2
(45) Date of Patent: Sep. 19, 2017

(54) DEADLOCK DETECTION IN HARDWARE DESIGN USING ASSERTION BASED VERIFICATION

(71) Applicant: Imagination Technologies Limited, Kings Langley (GB)

(72) Inventors: Ashish Darbari, Abbots Langley (GB); Colin McKellar, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 175 days.

(21) Appl. No.: 14/674,651

(22) Filed: Mar. 31, 2015

(65) Prior Publication Data

US 2016/0314223 A1 Oct. 27, 2016
US 2017/0177753 A9 Jun. 22, 2017

(30) Foreign Application Priority Data

Mar. 31, 2014 (GB) .................................. 1405742.6

(51) Int. Cl.
*G06F 9/455* (2006.01)
*G06F 17/50* (2006.01)

(52) U.S. Cl.
CPC ........ *G06F 17/5022* (2013.01); *G06F 17/504* (2013.01); *G06F 17/5045* (2013.01); *G06F 2217/06* (2013.01)

(58) Field of Classification Search
USPC ................................ 716/106, 107, 136, 138
See application file for complete search history.

(56) References Cited

U.S. PATENT DOCUMENTS

| | | | | |
|---|---|---|---|---|
| 4,751,727 A * | 6/1988 | Brahm | ................ | G06F 12/0692 379/269 |
| 5,163,016 A * | 11/1992 | Har'El | ................ | G06F 17/5045 716/102 |
| 5,544,332 A * | 8/1996 | Chen | ................ | G06F 13/362 700/14 |
| 8,381,148 B1 * | 2/2013 | Loh | ................ | G06F 17/505 703/16 |
| 2008/0177990 A1 * | 7/2008 | Banerjee | ............. | G06F 9/30156 712/227 |
| 2012/0151263 A1 * | 6/2012 | Rentschler | .............. | G06F 11/22 714/30 |
| 2016/0124827 A1 * | 5/2016 | Manoj Gangadhar | | ..................... G06F 17/5009 702/182 |
| 2016/0142064 A1 * | 5/2016 | Fu | ....................... | H04L 27/0014 375/344 |

* cited by examiner

*Primary Examiner* — Brian Ngo
(74) *Attorney, Agent, or Firm* — Vorys, Sater, Seymour and Pease LLP; Vincent M DeLuca

(57) ABSTRACT

Methods and systems for detecting deadlock in a hardware design. The method comprises identifying one or more control signals in the hardware design; generating a state machine for each of the one or more control signals to track the state of the control signal; generating one or more assertions for each control signal to detect that the control signal is in a deadlock state from the state machine; and detecting whether any of the one or more control signal are in a deadlock state using the assertions. The method may also comprise generating one or more fairness constraints to impose on a particular assertion and detecting the particular control signal is in the deadlock state using the assertions under the fairness constraints.

19 Claims, 10 Drawing Sheets

DEADLOCK DETECTION IN HARDWARE DESIGN USING ASSERTION BASED VERIFICATION

BACKGROUND

Hardware designs, such as system-on-chip (SoC) designs, are typically verified (i.e. determined to meet their specifications) before they are implemented in silicon because post-silicon error discovery can be very expensive. Hardware designs are often optimized for performance, power and area which can lead to a design which may end up in a lockup or deadlock state. A lockup or deadlock state is one that once reached, no combination of inputs, or combination of internal state interactions will cause the state to be exited (i.e. it is not possible to transition out of the state). A deadlock state occurs due to multiple contenders competing for resource utilization, hazard avoidance, performance boost or fine tuning area. A key requirement in any verification of a hardware design is to ascertain that there is no deadlock in the design.

Ideally deadlock detection in hardware designs comprises exhaustively analyzing all the states in a design, which takes a significant amount of time and resources to complete. However, due to the dominance of simulation based verification, in practice scoreboards and monitors are used to track the global end-to-end behavior of the design. If there is a deadlock in the design that can be triggered by a test bench stimulus then the deadlock may stall one or more transactions and therefore the states related to these transactions will not update as expected in the global scoreboard. For example, within a certain timeout period some transactions may not have been completed. This is discovered only at the end of the simulation when all of the tests have been completed, aborted or failed. Accordingly, the main problem with using simulation based verification to identify deadlock is that deadlock is not identified until the end of the simulation which makes it difficult to identify the source of the deadlock.

The embodiments described below are provided by way of example only and are not limiting of implementations which solve any or all of the disadvantages of known verification systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for identifying deadlock in a hardware design using assertion based verification. The method comprises identifying one or more control signals in the hardware design; generating a state machine for each of the one or more control signals to track the state of the control signal; generating one or more assertions for each control signal to detect that the control signal is in a deadlock state from the state machine; and detecting whether any of the one or more control signals are in a deadlock state using the assertions. The method may also comprise generating one or more fairness constraints to impose on a particular assertion and detecting the particular control signal is in the deadlock state using the one or more assertions under the fairness constraints.

A first aspect provides a method to detect deadlock in a hardware design, the method comprising: identifying one or more control signals in the hardware design; generating a state machine for each of the one or more control signals to track the state of the control signal; generating one or more assertions for each control signal to detect, using the state machine, whether the control signal is in a deadlock state; and detecting whether any of the one or more control signals is in a deadlock state using the one or more assertions.

A second aspect provides a system to detect deadlock in a hardware design, the system comprising: one or more state machines, each state machine configured to track the state of a control signal in the hardware design; and an assertion verification unit in communication with the one or more state machines, the assertion verification unit configured to use one or more assertions to analyze the one or more state machines to determine whether any of the one or more control signals is in a deadlock state.

A third aspect provides a computer readable storage medium having encoded thereon computer readable program code configured to perform the method of the first aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software as embodied in a non-transitory computer readable storage medium, which runs on or controls "dumb" or standard hardware, to carry out the desired functions. It is also intended to encompass software as embodied in a non-transitory computer readable storage medium, which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
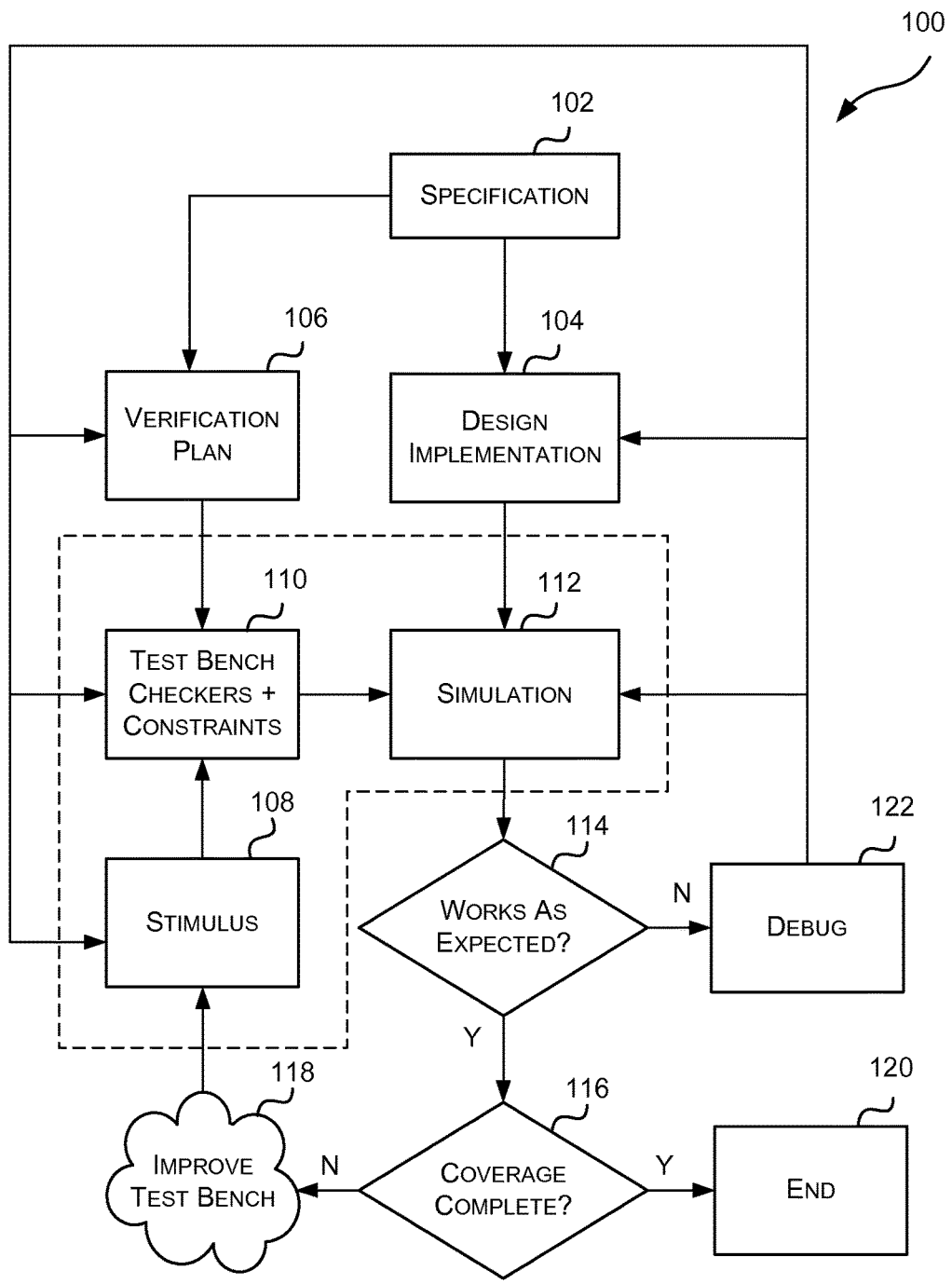
FIG. 1 is a flow diagram of a method of simulation based verification of a hardware design.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments described herein relate to methods and systems for detecting deadlock in a hardware design using assertion-based verification (ABV). The term "hardware design" is used herein to refer to an analog or digital implementation of a specification (e.g. user specified functionality) for an electronic device (e.g. a processor) that is ultimately synthesized into silicon.

Deadlock detection is the process of detecting whether a hardware design can enter a deadlock state. A deadlock state is a state that once reached, no combination of inputs, or combination of internal state interactions will cause the state to be exited (i.e. it is not possible to transition out of the state). The terms deadlock and lockup will be used interchangeably herein.

In the embodiments described herein deadlock is detected using assertion-based verification. In particular, one or more key control signals in the hardware design are identified; a state machine is generated for each of the key control signals to track the state of the control signal; an assertion is generated for each key control signal to detect whether the control signal is in a deadlock state from the state machine; and the assertions are used to determine whether any of the key control signals are in a deadlock state. The assertions may be verified using formal assertion based checkers (i.e. formal verification) or the assertions may be simulated in a directed or constrained random based dynamic simulation (i.e. simulation based verification).

Since a hardware design may have hundreds of key control signals and more than a million data paths/signals, by analyzing and/or monitoring the state of a few key control signals instead of the million plus data paths/signals, deadlock in a hardware design can be more easily and more efficiently detected. The term "data signal" is used herein to mean a signal that carries data (e.g. data payload) from one point or block of the design to another point or block of the design. This is contrasted with a control signal which is a signal that controls the movement of data from one point or block to another. In particular, control signals control what data is moved, where and when. For example, control signals may regulate how long it takes for data to move from one block to another, when the data values arrive at another block, and/or the recipient block.

As is known to those of skill in the art an assertion is a statement about a specific property that is expected to hold for a design (e.g. is always true). In other words, an assertion is an expression that, if false, indicates an error. Within hardware description language (HDL) designs, an assertion is an executable statement that checks for specific behavior within the HDL design. For example if a design contains a FIFO (first in first out) buffer the designer would define assertions that capture the design intent (i.e. that neither overflow nor underflow of the FIFO may occur).

An assertion is typically written in an assertion language. Assertion languages include, but are not limited to, System-Verilog (SV), Property Specification Language (PSL), Incisive Assertion Library (IAL), Synopsys OVA (Open Vera Assertions), Symbolic Trajectory Evaluation (STE), SystemC Verification (SCV), 0-In, Specman, and OpenVera Library (OVL).

Assertion-based verification involves the use of assertions for the verification of a specification (or part thereof) through simulation based verification or formal verification. The main difference between simulation based verification and formal verification is that simulation based verification is input-based (e.g. the test engineer supplies the test input signals) and formal verification is output-based (e.g. the test engineer provides the output properties to be verified). Assertions act as monitors during simulation, detecting errors close to their source. Formal verification using assertions provides exhaustive verification of blocks and interfaces. These two different verification methods will be described with reference to FIGS. 1 and 2.

Reference is now made to FIG. 1 which illustrates a method 100 for implementing simulation based verification.

During simulation based verification a design specification (e.g. desired circuit behavior) 102 is implemented in a high level hardware description language (HDL), such as, but not limited to a register transfer language (RTL) 104. Examples of register transfer languages include, but are not limited to, VHDL (VHSIC Hardware Description Language) and Verilog. It will be evident to a person of skill in the art that other high level languages may be used such as proprietary high level languages. The implementation is referred to as the design under test (DUT).

The specification (e.g. desired circuit behavior) 102 is also used to generate a verification plan 106. The verification plan 106 details the specific functionality to be verified. A verification plan may comprise features, operations, corner cases, transactions etc., so that the completion of verifying them constitutes verification of the specification 102.

The verification plan 106 is then used to generate a test bench. As is known to those of skill in the art the test bench comprises stimulus 108 and test bench checkers and constraints 110. The test bench applies the stimulus 108 to the DUT 104 during simulation 112 and then captures the output. The test bench checkers 110 are then used to determine if the DUT is working as expected 114. In some cases the test bench checkers 110 may be configured to compare the output of the DUT 104 to a known or reference output.

If the DUT 104 is acting as expected, then the method 100 proceeds to block 116 where the coverage of the simulation is checked. In particular, the quality of the simulation is measured by the percentage of the design code that is stimulated and verified (referred to herein as the coverage metric). Accordingly, at bock 116 the system receives feedback from the simulation 112 and determines the coverage metric and compares this to a coverage specification which details the required amount of coverage. If the coverage metric is less than specified in the coverage specification then the test bench, including stimulus 108 and test bench checkers and constraints 110, are modified 118 to increase the coverage (e.g. by adding stimulus to parts of the design that have not been tested). If the coverage metric is equal to or greater than that specified in the coverage specification then the verification ends 120.

If the DUT 104 is not acting as expected (e.g. the simulation output does not match the reference output), then the method 100 proceeds to a debug stage 122 where the source of the error/bug is identified. Once the bugs have been identified this information may be used to update the design implementation 104, simulation 112, verification plan 106, test bench checkers and constraints 110, and/or stimulus 108.

Assertions can be used in simulation-based verification to monitor certain conditions. Assertions used in this way can improve observability by being able to identify bugs once they are triggered by specific stimuli (e.g. specific test vector(s)). Without assertions an error or bug (e.g. deadlock) is only identified if it propagates to an observable output and it is only evident at the end of the simulation. By using assertions, errors and bugs inside the design can be checked and observed instantly, at their source.

Figure 2:
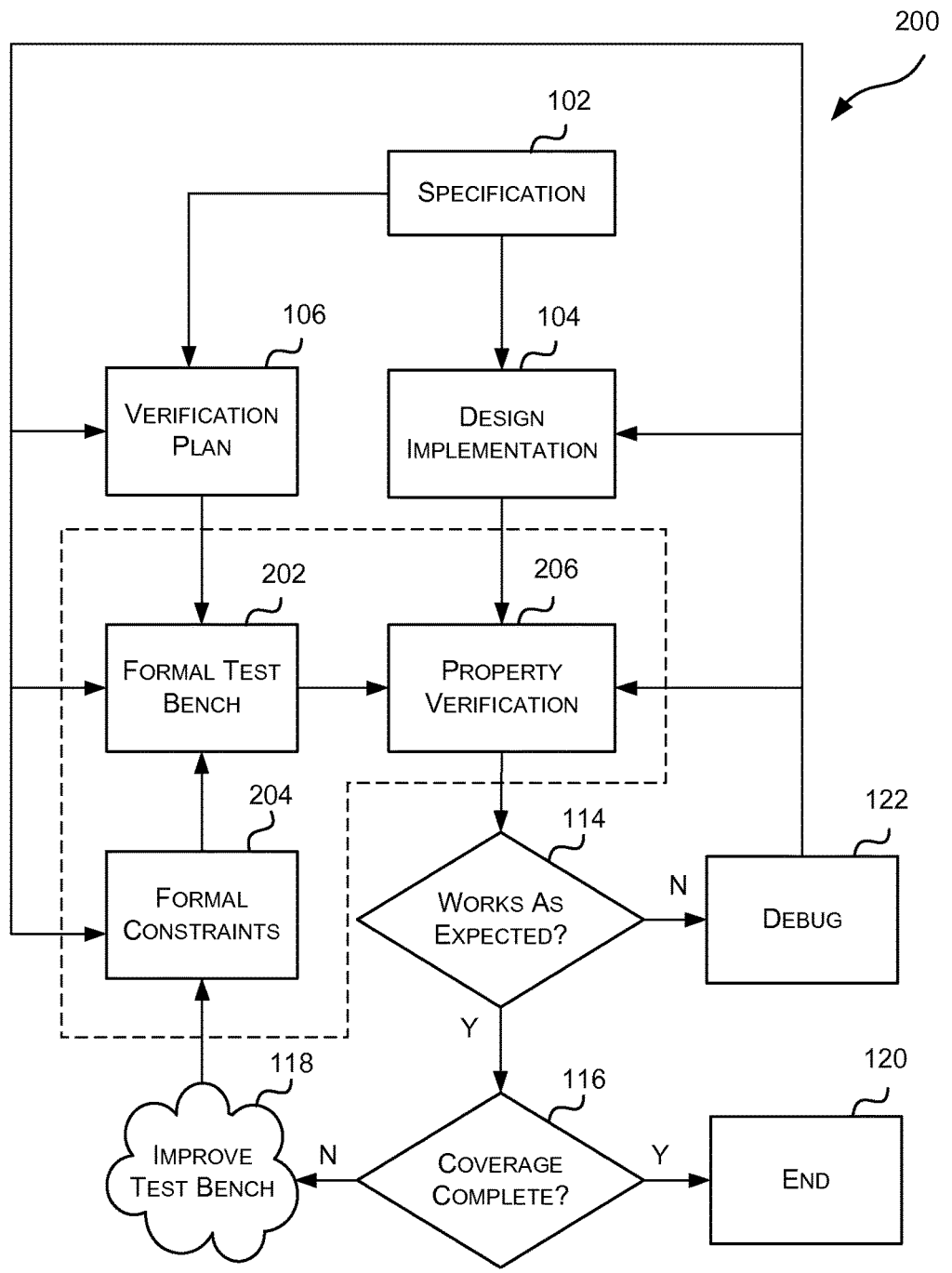
FIG. 2 is a flow diagram of a method of formal verification of a hardware design.

As described above, formal verification, in contrast to simulation based verification does not require the generation of stimulus. Reference is now made to FIG. 2 which illustrates a method 200 for formal verification of a hardware design using property checking. In property checking, part of a design (i.e. a property of the design) is proved or disproved. Method 200 is the same as method 100 except the stimulus, test bench checkers and simulation blocks 108, 110 and 112 are replaced with blocks 202, 204 and 206.

In particular, in method 200 of FIG. 2 the verification plan 106 is used to develop a formal test bench 202. The formal test bench 202 includes the property to be proved or disproved and a property verifier to verify the property.

Because a property is an alternative way of expressing part of a design specification a failure can be caused by unintended input or state configurations. To remove unintended configurations from interfering with the property verifications formal constraints 204 may be developed to constrain the inputs or states to produce only permissible inputs.

At block 206 the property verifier is applied to the DUT 104 to verify the properties. Accordingly, the property verifier verifies whether the design implementation (e.g. high level language implementation, done in VHDL or Verilog) meets the specification (which is expressed using properties).

In some cases the design implementation is transformed into a mathematical model (e.g. a state-transition system) and the properties are expressed using mathematical logic using a language with a precise mathematical syntax and semantics. In these cases a property may be verified by searching the entire reachable state space of the design implementation (e.g. state transition system) without explicitly traversing the state machine. The search is done by, for example, encoding the states using efficient Boolean encodings using Binary decision diagrams (BDDS), or using advanced SAT (satisfiability-based bounded model checking) based techniques. In some cases tools can be used to implement techniques, such as, but not limited to, abstraction, symmetry, symbolic indexing, and invariants to improve performance and achieve scalability.

Verifying properties in this manner allows a property to be exhaustively proved or disproved for all states.

Furthermore, by expressing the properties using mathematical logic the properties can be used not only to verify the design implementation, but also to serve as documentation which can be used to review and ascertain whether the design is intended to have particular behavior.

Assertions can be used in formal verification to define the property to be verified.

Using assertions in formal verification either proves or disproves design behavior for all possible states (as specified by any constraints). This allows bugs to be identified quickly and easily without having to develop stimuli (e.g. test vectors).

Assertions in formal verification can also improve controllability as compared to simulation based verification. Low controllability occurs when the number of simulation test signals or vectors required to thoroughly simulate a design becomes unmanageable. For example, a 32-bit comparator requires $2^{64}$ test vectors. This would take millions of years to verify by simulation based verification. By performing formal verification of an assertion, the 32-bit comparator can be verified in less than a minute.

In general, ABV (either simulation-based verification using assertions or formal verification using assertions) improves the design observability as it allows any point in the system (including internal state and data path analysis) to be observed and checked. Assertions also improve debugging as functional bugs are identified at or very close to the source of the problem, making it easier to see bugs and reducing debug time. Assertions can also find bugs which do not propagate to the output. Assertions can also be used throughout the life cycle of a design (i.e. as changes are made to the design).

Described herein are systems and methods which use assertion-based verification (ABV) to detect deadlock in a hardware design.

Figure 3:
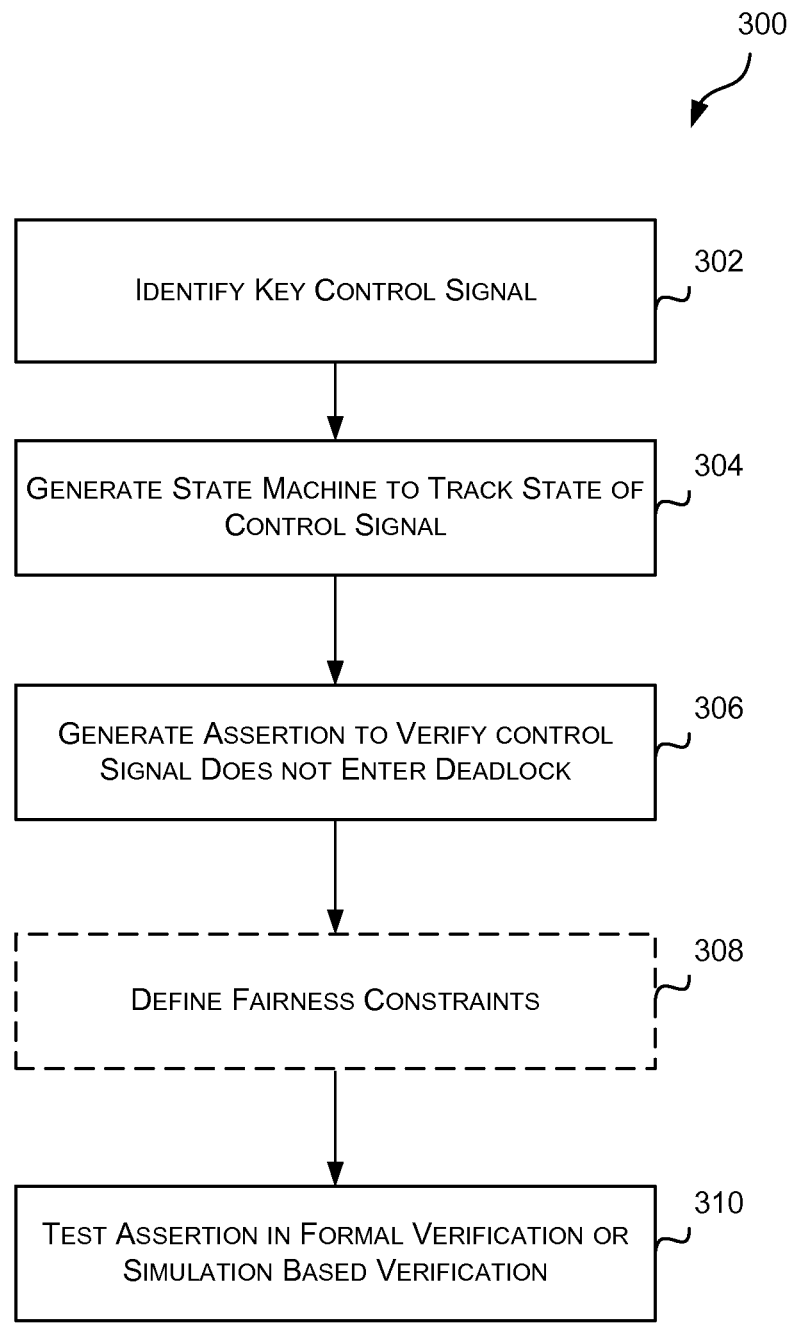
FIG. 3 is a flow diagram of an example method for detecting deadlock in a hardware design using assertion based verification.

Reference is now made to FIG. 3 which illustrates an example method 300 for detecting deadlock in a hardware design using ABV. The method 300 begins at block 302 where one or more key control signals in the hardware design are identified. Key control signals are defined as control signals that enable or block an action from happening (e.g. cause the hardware design to move forward, or stop it from moving forward). Examples of key control signals include, but are not limited to, handshake signals used to transfer data from one block of the hardware design to another, and stall signals. For example, if the handshake signal is never asserted then the data will not be able to move between the blocks. Similarly, if an item is stalled indefinitely then the system cannot move forward. An example of a handshake control signal will be described with reference to FIG. 4.

In some cases the key control signals are identified in the specification 102 or another configuration file as key control signals. In other cases, the key control signals are automatically extracted from the hardware design. In particular, the key control signals may be automatically identified by analyzing an abstract syntax tree of the parsed RTL to identify the control signals or expressions that are arguments of decision logic such as, but not limited to, if-then-else statements and case statements For example, given the following RTL code some_event0 and some_event 1 would automatically be identified as key control signals:

if (some_event0)
    reg1<=reg2;
    else if (some_event1)
    reg1<=reg3;
    else
    reg1<=reg4;

Once the key control signals have been identified, the method 300 proceeds to block 304.

At block 304, a state machine is generated in an assertion language for each identified key control signal to monitor the state of the control signal. In some examples, the state machine may comprise logic to monitor/determine the state of the control signal and a register for storing the current state of the control signal. An example state machine will be described with reference to FIG. 6. Once a state machine has been generated for each identified control signal, the method 300 proceeds to block 306.

At block 306, an assertion (in an assertion language) is generated for each identified key control signal that uses the state machine information to determine or identify whether the control signal is in a deadlock state. In some examples the assertions may be configured to identify a deadlock if the state machine indicates that the control signal has reached a deadlock state and will not eventually come out of the deadlock state. For example, an assertion may state that if a control signal is low it must eventually come high (or be enabled), otherwise there is an error. Example assertions will be described with reference to FIG. 6. Once an assertion has been generated for each identified key control signal the method 300 may proceed to block 308 or block 310.

At block 308, in some cases one or more fairness constraints are generated for the assertions generated at block 306. In particular, to reduce the noise from failure of the assertion (e.g. false detection of deadlock) fairness constraints may be imposed. Fairness constraints are constraints that are imposed on the DUT during testing to force a fair behavior on the inputs. In particular, fairness constraints ensure certain behavior takes place on one or more inputs to allow a valid sequence of state transformations and interactions to take place during symbolic simulation and state-specification searching using formal verification.

For example, if a certain control signal can only be generated after a certain input signal goes high then a fairness constraint may be imposed to ensure the input signal goes high at some point. When fairness constraints are applied incorrectly, they can over-constrain the test environment and can lead to real deadlocks being missed or not properly identified. However, not using fairness constraints may result in spurious failures.

In some cases fairness constraints may be automatically generated based on information supplied by the user on which drivers of the key control signals are inputs to the block. They may present by default because other checks (e.g. assertions) have been written for the design or it may be specified in the specification. An example of an input condition and corresponding fairness constraint will be described with reference to FIG. 5. Once the fairness constraints have been generated, the method 300 proceeds to block 310.

At block 310, the assertion(s) generated in block 306 are checked using either formal verification or simulation based verification. For example, in some cases the assertion may be verified or checked using a formal assertion based checker or tool such as, but not limited to, Cadence IEV, Jasper's Japser Gold, and OneSpin 360 (i.e. formal verification). In other cases the assertions may be simulated in a directed or constrained random based dynamic simulation (i.e. simulation based verification). Where the assertion fails or is not verified, then an indication of the failure or detected deadlock may be output.

Figure 4:
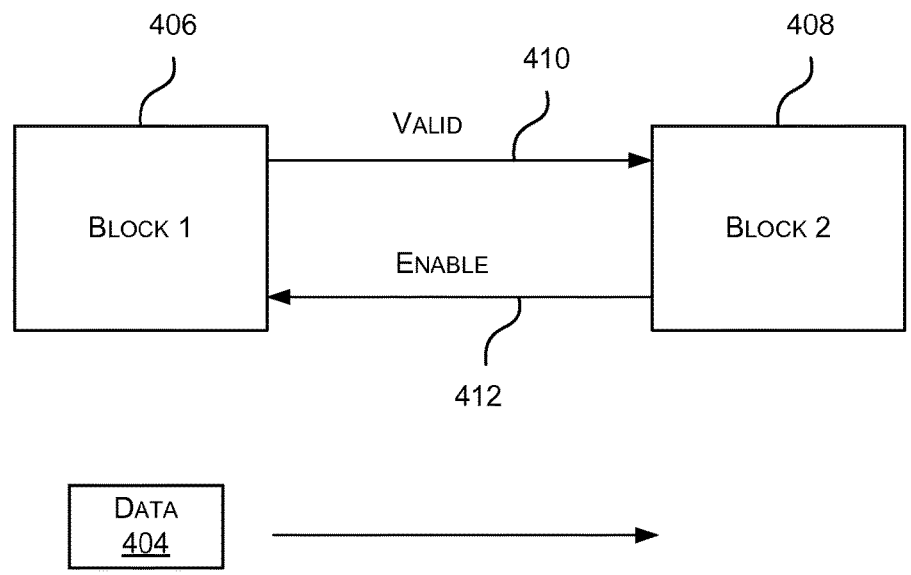
FIG. 4 is a block diagram of an example data transfer from one design block to another design block.
Figure 4:
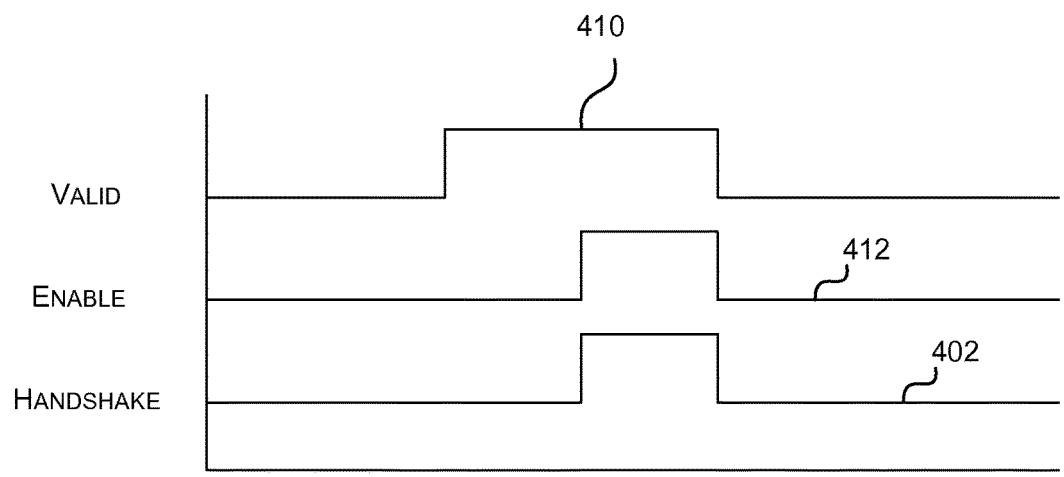

As described above, one example key control signal is a handshake signal used to transfer data from one design block to another design block. Reference is now made to FIG. 4 which illustrates a handshake signal 402 which is used to transfer data 404 from a first design block 406 to a second design block 408. The handshake signal 402 is defined to be equal to the valid signal 410 and the enable signal 412 of the RTL. The valid signal 410 is used to indicate that the first block 406 has valid data and the enable signal 412 is used to indicate that the second block 408 is ready to receive data. Only if both the valid signal 410 and the enable signal 412 are high can data 404 be transferred from the first block 406 to the second block 408. Accordingly, the handshake signal 402 is high or enabled when both the valid signal 410 and enable signal 412 are high or enabled.

The handshake signal may be represented in the specification 102 in one of the following example formats making it easy to identify in the specification 102. The first example format is a CSV format that is easily extracted out of a spread sheet or built into a spread sheet through human input or an automatic algorithm.

handshake, valid && enable
    handshake=valid && enable

Figure 5:
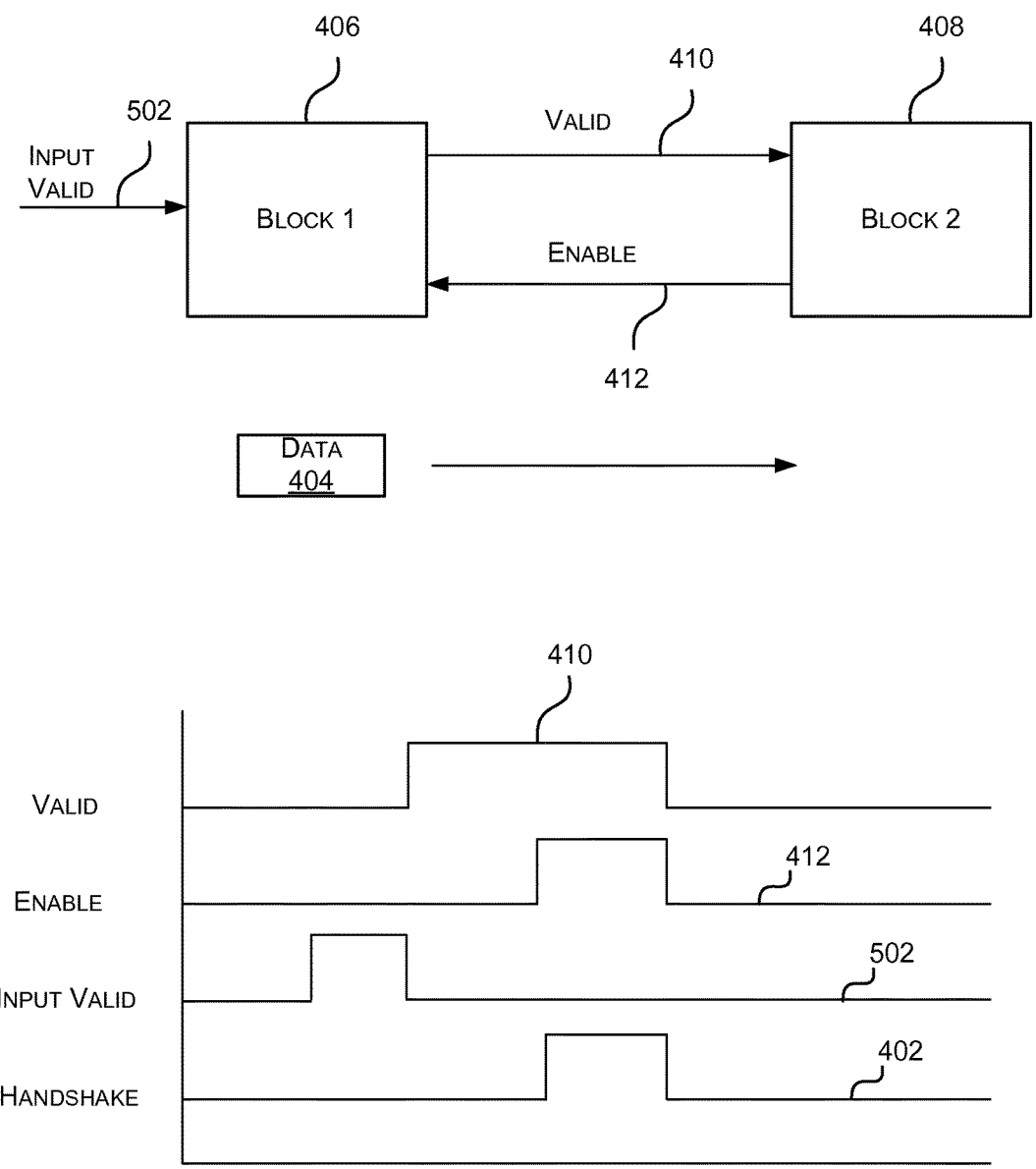
FIG. 5 is a block diagram of the data transfer of FIG. 4 with an input constraint.

As described above, the control signals may be dependent on certain input signals. This is illustrated in FIG. 5 where the handshake signal 402 is dependent on the input valid signal 502. In some cases, as shown in FIG. 5, the first block 406 may be configured to activate the valid signal 410 subsequent to receiving an input valid signal 502. In these cases the input valid signal 502 effectively triggers a pipelined valid flow. In other cases, the input valid signal and the valid signal may be configured to be activated at the same time. This may be used, for example, where the first block 402 is concurrently accepting data and transferring data. In particular when the first block 406 is accepting data on an input interface the input valid signal goes high, and concurrently while the first block 406 is transferring data to the second block 408 the valid signal goes high.

Accordingly, a fairness constraint may be imposed to ensure that at some point the valid input signal goes high (otherwise the handshake signal will never go high). An example fairness constraint will be described with reference to FIG. 6.

The relationship between the input valid signal 502 and the handshake signal 402 may be represented in the specification 102 in one of the following example formats making it easy to identify in the specification 102:

handshake, valid && enable, valid
    handshake=valid && enable, valid

Figure 6:
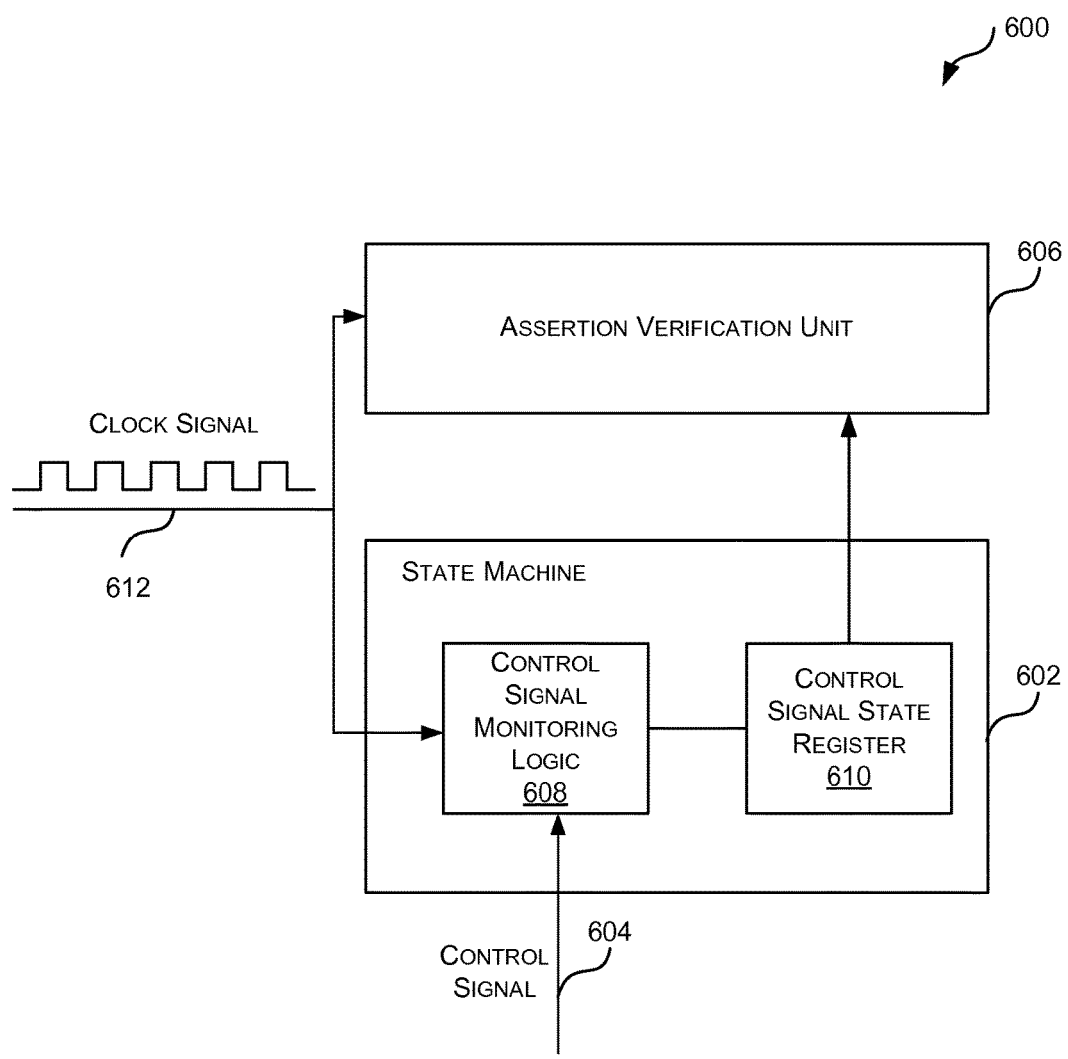
FIG. 6 is a schematic diagram of a system for detecting deadlock in a hardware design using assertion based verification.

Reference is now made to FIG. 6 which illustrates an example system 600 for detecting deadlock in a hardware design using assertion-based verification. The system 600 of FIG. 6 is designed to detect deadlock by monitoring the state of a single control signal, however, it will be evident to a person of skill in the art that the same concept can be used to monitor multiple control signals. In particular, the system 600 of FIG. 6 comprises a single state machine 602 that monitors the state of a particular control signal 604 and an assertion verification unit 606 that determines whether the control signal is in a deadlock state from the state of the state machine 602 using one or more assertions written in an assertion language. In other examples, the system may comprise multiple state machines, each configured to track and monitor the status of a particular control signal. In these examples, there may be a single assertion verification unit 606 for detecting deadlock for all the control signals, or there may be multiple assertion verification units.

As described above, the state machine 602 monitors the control signal 604 (e.g. the handshake signal 402 of FIGS. 4 and 5, or a stall signal) to keep track of the state of the control signal. In the example shown in FIG. 6, the state machine comprises control signal monitoring logic 608 to determine the state of the control signal (e.g. whether the control signal is ON/Enabled or OFF/Disabled). The state is then saved in a register 610. In some cases the control signal monitoring logic 608 is triggered by a clock signal 612 (e.g. the positive or rising edge of the clock signal).

The following is example SV code for implementing the control signal monitoring logic 608 for monitoring the control signal 604 (e.g. the handshake signal 402 of FIGS. 4 and 5, or a stall signal):

```
always @(posedge clk or negedge resetn)
  if (!resetn)
    control_signal_register<=1'b0;
  else if (control signal)
    control signal_register<=1'b1;
  else if (!control signal)
    control_signal_register<=1'b0;
``` where clk is the clock signal 612, resetn is a reset signal used to reset the system 600, control_signal is the control signal 604 (e.g. the handshake signal 402 of FIGS. 4 and 5, or a stall signal), and control_signal_register is the control signal state register 610.

In this example SV implementation of the control signal monitoring logic 608, when the logic 608 detects the positive edge of the clock signal 612 it determines whether there is a control signal 604 (e.g. handshake or stall). If there is a control signal 604 (e.g. handshake or stall) at that clock edge then the control signal state register 610 is set (e.g. set to a non-zero or high value) at the next rising edge of the clock signal 612 (this is denoted by the "<=" symbol in the sample code). If, however, the control signal (e.g. handshake or stall) is "low" at the initial rising edge of the clock signal 612 then the control signal state register 610 is reset (e.g. set to a zero or low value) at the next rising edge of the clock signal 612.

It will be evident to a person of skill in the art that this is an example only and the control signal monitoring logic 608 may be implemented in another suitable manner.

The assertion verification unit 606 periodically determines whether the control signal 604 is in a deadlock state by evaluating one or more assertions that verify the value of the control signal state register 610. In some cases the assertion verification unit 606 is configured to evaluate the assertion(s) each time it detects the rising edge of the clock signal 612. However, other events may trigger evaluation of the assertion(s).

In some cases one of the assertions defines a deadlock state as one where the control signal is low and does not eventually go high. If the assertion verification unit 606 detects that the control signal is in deadlock then the assertion verification unit 606 may output an error message. If, however, the assertion verification unit 606 does not detect deadlock then the assertion verification unit 606 continues to monitor the control signal state register 610.

In some cases the assertion verification unit 606 is configured to verify the assertion using formal verification. In other cases the assertion verification unit 606 is configured to verify the assertion using simulation based verification (e.g. the assertion is simulated).

The following is a first example of SV code of an assertion to detect deadlock of a control signal (e.g. handshake signal 402 of FIGS. 4 and 5 or a stall signal) that may be verified by the assertion verification unit 606:

```
deadlock_detection_assertion:
  assert property (@(posedge clk) disable iff (!resetn)
    !control_signal_register|->eventually
    control_signal_register);
``` where clk is the clock signal 612, resetn is a reset signal used to reset the system, control_signal_register is the register 610 that stores the state of the control signal (e.g. handshake signal 402 of FIGS. 4 and 5 or a stall signal).

The first example assertion states that when control_signal_register (register 610) has a low value it eventually (i.e. sometime in the future) will go high.

As is known to those of skill in the art "eventually x" (which may alternatively be expressed as ##[0:$]) is an SV construct that states that sometime in the future x will be true. An eventuality that is unbounded in time like this is referred to as a liveness property.

In formal verification a liveness property will fail if a single infinite path is identified that prevents the requirements being met. A liveness property fails either because the design is unable to satisfy the requirements irrespective of input activity; or the design is unable to satisfy the requirements due to lack of input activity. If the failure is due to lack of input activity then fairness constraints can be used to eliminate the design from failing in these instances.

In simulation based verification a liveness property will fail if it remains unsatisfied at the end of the simulation. A failure in this case may be caused because the design has a bug or an error; the design needs further/different input stimulus to allow the design to satisfy the requirement, or the required stimulus was input but the simulation did not run long enough. Therefore, the accuracy of simulation based verification in identifying deadlock using assertions is dependent on how long the simulation is permitted to run and the specific stimulus used.

As described above, an assertion may be verified using formal verification or simulation-based verification. If the first example SV assertion is verified using simulation-based verification a new simulation thread is initiated each time the control signal is low. This significantly increases the overhead on simulation speed which may make the simulation in some cases up to nine times slower. Since an assertion is verified in a different manner in formal verification this issue does not arise in formal verification.

The following is a second example of SV code of an assertion to detect deadlock of a control signal (e.g. handshake signal 402 of FIGS. 4 and 5 or a stall signal) that may be verified by the assertion verification unit 606. This example is more efficient for simulation-based verification (but also may be used in formal verification).

```
main_assertion:
  assert property (@(posedge clk) disable iff (!resetn)
    !$fell(control_signal_register)|->##[0:$]
    $rose(control_signal_register));
``` where clk is the clock signal 612, resetn is a reset signal used to reset the system, control_signal_register is the register 610 which stores the state of the control signal 604 (e.g. handshake signal 402 of FIGS. 4 and 5 or a stall signal).

This assertion states that when the control_signal_register falls (i.e. goes from high to low) it eventually (i.e. sometime in the future) rises (i.e. goes to a high value).

As is known to those of skill in the art, $fell (x) is an SV construct, that says the monitored signal x goes from high to low between any two pairs of adjacent positive edges of the clock (i.e. the signal was high in the previous cycle and is low in the current cycle). Similarly, $rose (x) is an SV construct, that says that the monitored signal x goes from low to high between any two pairs of adjacent positive edges of the clock (i.e. the signal was low in the previous cycle and is high in the current cycle).

This example assertion is more efficient for simulation-based verification than the first example assertion since an active simulation thread is only created when $fell and $rose are true. This is because $fell and $rose are two cycle operators. The predicate $fell (x) is only true if x was high in the previous cycle and low in the current cycle. As described above, the converse is true for $rose (x). In particular, where the control signal remains low forever $fell (control_signal_register) won't ever be true and this won't create an active simulation thread, making simulation more efficient. The same argument holds for $rose (x). If the control_signal goes from low to high, $rose (control_signal_register) goes high or true, and simulation evaluation stops marking the assertion as valid (i.e. it marks it has invalid). If $rose (x) was not used and the control signal were to remain high for several cycles, the simulators would continue to evaluate the assertion over several cycles causing slowdown.

However, the second example assertion may result in a false positive (e.g. it may detect that the assertion is true when in fact it is not) in some cases. For example, when there is no $fell(control_signal_register) (i.e. the control signal does not fall from high to low). This is because if the predicate $fell is not true (i.e. never happens) then it is assumed that the assertion is vacuously true. This can be addressed by adding an additional auxiliary assertion.

For example, the following auxiliary assertion is also verified to ensure that when reset goes active low and the control signal is low then eventually $rose(control_signal_register) is true (i.e. the control signal goes from low to high). This assertion only gets evaluated once in simulation (e.g. upon reset).

aux_assertion:
assert property (@(posedge clk) disable iff (!resetn)
detect_reset && !control_signal_register|→##[0:$]
$rose(control_signal_register));

where detect_reset is a register that gets set when the design comes out of reset (i.e. when resetn goes low). When the design has come out of reset, the resetn signal will remain high and the detect_reset register will remain low. Therefore, the detect_reset register only goes high for one cycle (when the design comes out of reset).

In the cycle when detect_reset is high, if control_signal_register is low, then control_signal_register must go high sometime in the future. This ensures the coverage of the scenario where control_signal_register always remains low and thus $fell(control_signal) never goes high. If control_signal_register was high in the cycle where detect_reset is high, then the right-hand side of the assumption is true then the property is legally true. In this case if control_signal_register were to go low again, it would trigger the main assertion because $fell(control_signal_register) would be true which would check for control_signal_register going high again.

As described above, in some cases fairness constraints may be imposed on the verification or evaluation of certain assertions. For example, if a control signal is dependent on a certain input signal a fairness constraint may be generated to constrain verification or evaluation of the assertion to cases where the input signal is provided. The following is an example of an SV fairness constraint (implemented as an assumption) to constrain evaluation of the handshake assertion to cases where the input valid signal is enabled:

fairness_constraint:
assume property (@(posedge clk) disable iff (!resetn)
!valid|→##[0:$] valid);

where clk is the clock signal 612, resetn is a reset signal used to reset the system, and valid is the input valid signal 502 of FIG. 5.

The fairness constraint may be optimized for simulation-based verification in the same manner as an assertion using $fell and/or $rose as described above. For example, the above assumption may be replaced by the following two assumptions:

main_assumption:
assume property (@(posedge clk) disable iff (!resetn)
$fell(valid)|→##[0:$] $rose(valid));
aux_assertion:
assert property (@(posedge clk) disable iff (!resetn)
detect_reset && !valid|→##[0:$]
$rose(valid));

It will be evident to a person of skill in the art that these are examples only and other suitable assertions and fairness constraints (assumptions) may be used. For example, while SV concurrent assertions and assumptions are used in the examples shown above, it will be evident to those of skill in the art that assertions and assumptions written in other languages and immediate assertions and assumptions may also be used.

Figure 7:
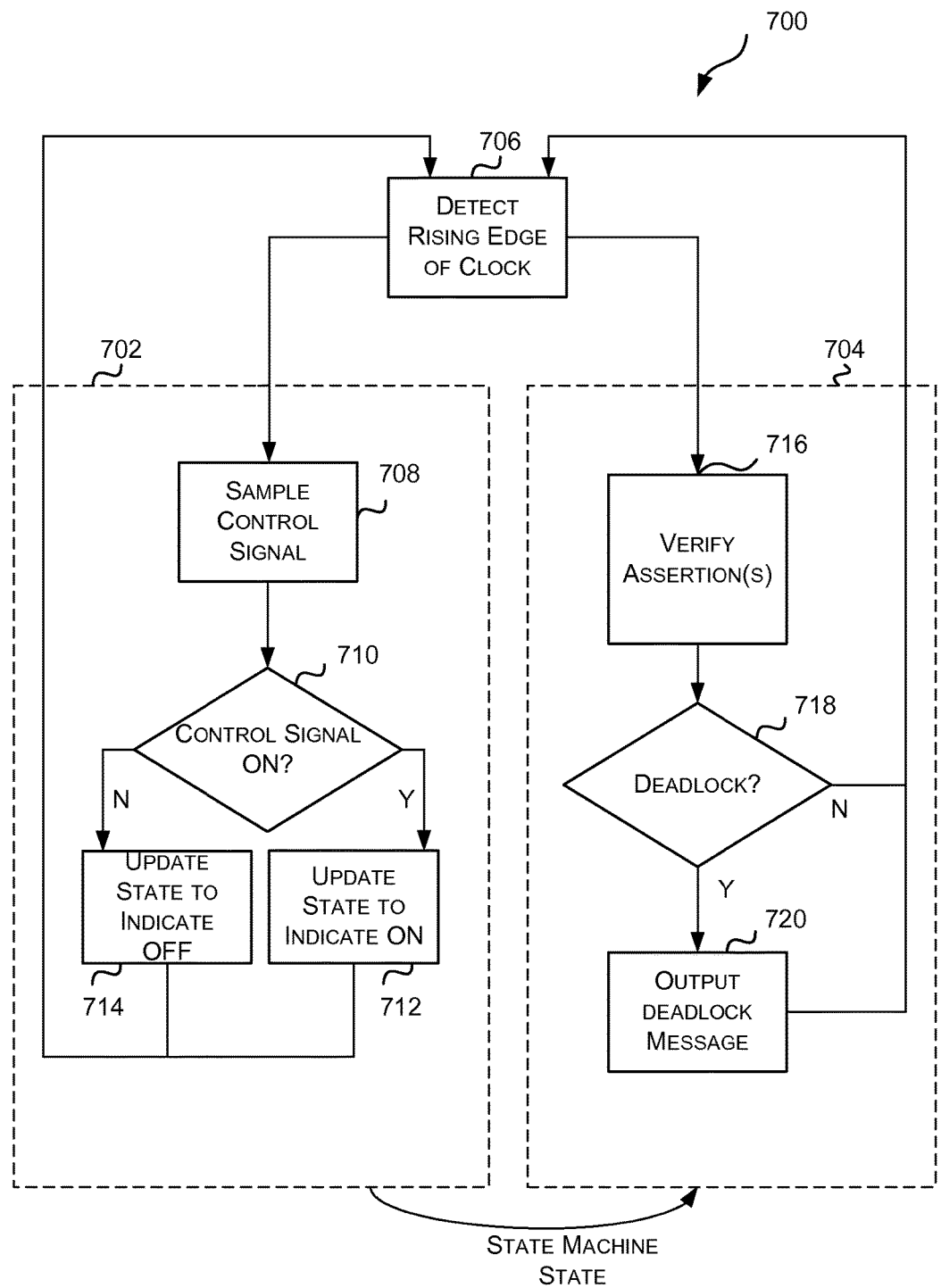
FIG. 7 is a flow diagram of method for detecting deadlock in a hardware design using the system of FIG. 6.

Reference is now made to FIG. 7 which illustrates an example method 700 for detecting deadlock in a hardware design using the system of FIG. 6. The method 700 comprises two processes 702 and 704 which may be executed in parallel. In method 700, each process 702 and 704 is triggered by the rising edge of a clock signal 706 (e.g. clock signal 612 of FIG. 6). In other examples, the processes 702 and 704 may be triggered by another event. In some cases, the processes 702 and 704 may be triggered by separate or different events.

The first process 702, which may be executed by the state machine 602 of FIG. 6, monitors a control signal (e.g. control signal 604 of FIG. 6) to determine the state of the control signal (e.g. whether the control signal is ON or OFF). The second process 704, which may be executed by the assertion verification unit 606 of FIG. 6, periodically checks the state of the control signal using one or more assertions to determine if the control signal is in a deadlock state.

In the first process 702, once the rising edge of the clock signal is detected 706, the control signal (e.g. control signal 604 of FIG. 6) is sampled 708. It is then determined 710 whether the control signal is ON (i.e. has a high value). If it is ON (i.e. it has a high value) then at block 712 the state machine is updated to indicate the control signal is in an ON state. If, however, the control signal is not ON (i.e. it is OFF/has a low value) then the state machine is updated to indicate the control signal is in an OFF state 714. In some cases the state information is stored in a register (e.g. register 610 of FIG. 6). The process 702 then proceeds back to block 706 where it waits for the next rising or positive edge of the clock signal.

In the second process 704, blocks 716 to 720 are executed to evaluate an assertion to determine whether the control signal is in a deadlock state. In particular, in block 716 one or more assertions are verified or evaluated to assess the control signal state tracked and recorded by the first process 702. At block 718 it is determined whether the control signal is in a deadlock state (e.g. if the assertion is not true). If the control signal is not in a deadlock state (e.g. the assertion(s) is/are true) the process 704 proceeds back to block 706 where it waits for the next rising edge of the clock signal. If, however the control signal is in a deadlock state (e.g. the assertion(s) is/are false), the process 704 proceeds to block 720 where a deadlock or error message is output. As described above, in some cases the assertions are constrained by one or more fairness constraints.

Figure 8:
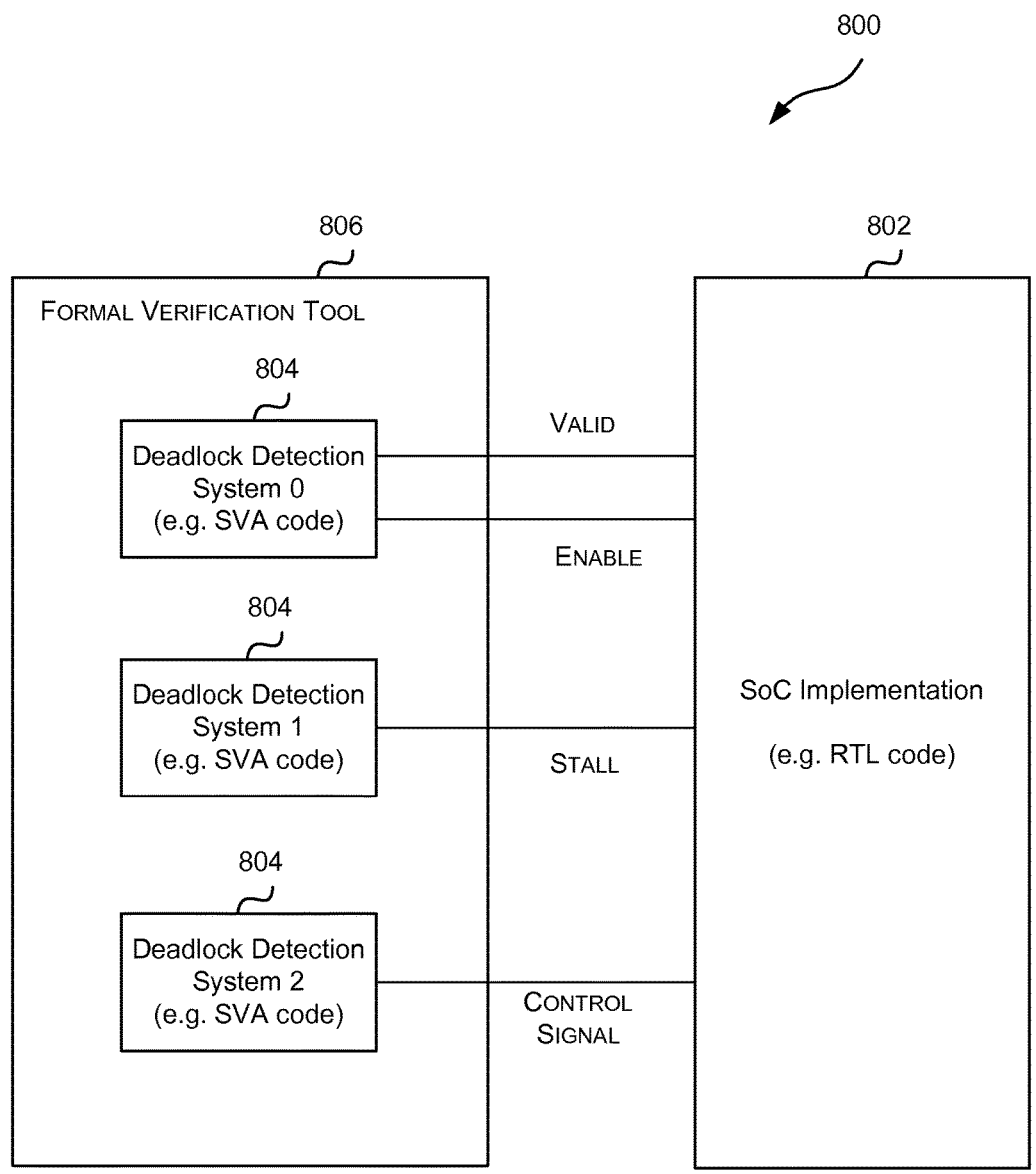
FIG. 8 is a block diagram of a formal verification system for detecting deadlock in a hardware design using the system of FIG. 6.
Figure 9:
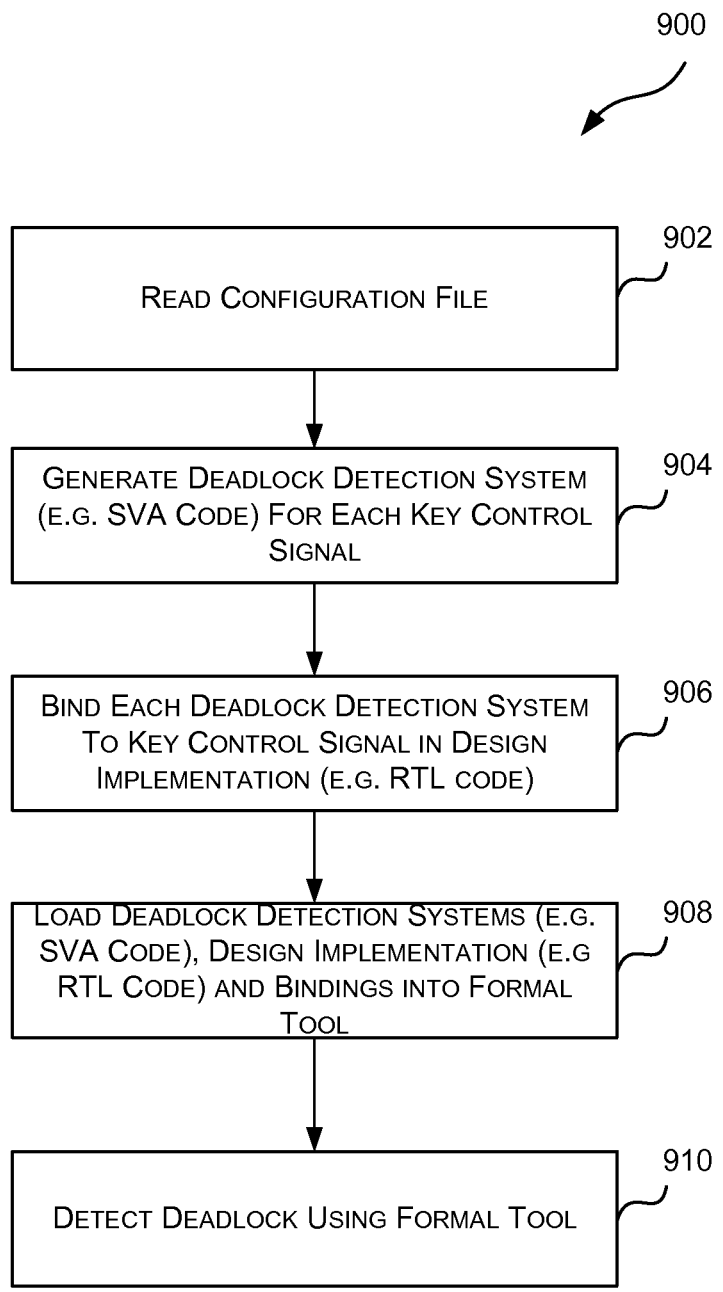
FIG. 9 is a flow diagram of a method for detecting deadlock in a hardware design using the system of FIG. 8.

Reference is now made to FIGS. 8 and 9 which illustrate how the deadlock detection system 600 of FIG. 6 may be used in formal verification to detect deadlock in a hardware design (e.g. SoC design). In particular, FIG. 8 illustrates an example formal verification test system 800 and FIG. 9 illustrates a flow chart of a method 900 for implementing the test system 800. At block 902 a configuration file (e.g. the specification) is read which identifies the key control signals in the design implementation (e.g. SoC implementation) 802. For each key control signal identified in the configuration file an instance 804 of the deadlock detection system 600 is generated at block 904. For example, where the deadlock detection system 600 is implemented in SV, an SV instance 804 of the deadlock detection system (logic, registers, state machines and assertions) is created for each key control signal identified in the configuration file.

Once an instance 804 of the deadlock detection system 600 has been created for each identified key control signal, at block 906 each instance 804 is bound to the corresponding control signals of the design implementation 802. For example, where the design is implemented in RTL and the deadlock detection system is implemented in SV, each SV instance is bound to the corresponding control signal in the RTL code. Where a key control signal, such as the handshake signal described above, is based on more than one RTL signal (e.g. valid and enable) then the deadlock detection system instance 804 is bound to each of the RTL signals making up the key control signal.

Once each deadlock detection system (e.g. SV instance) has been bound to the corresponding control signal(s) of the design implementation (e.g. RTL code), at block 908 the deadlock detection systems (e.g. SV code), design implementation (e.g. RTL code) and bindings are loaded into a formal verification tool 806, such as, but not limited to, Cadence IEV, Jasper's Jasper Gold, and OneSpin, to establish the test environment.

At block 910 the formal verification tool 806 is then used to detect deadlock in the design implementation (e.g. RTL code) using the defined assertions.

Figure 10:
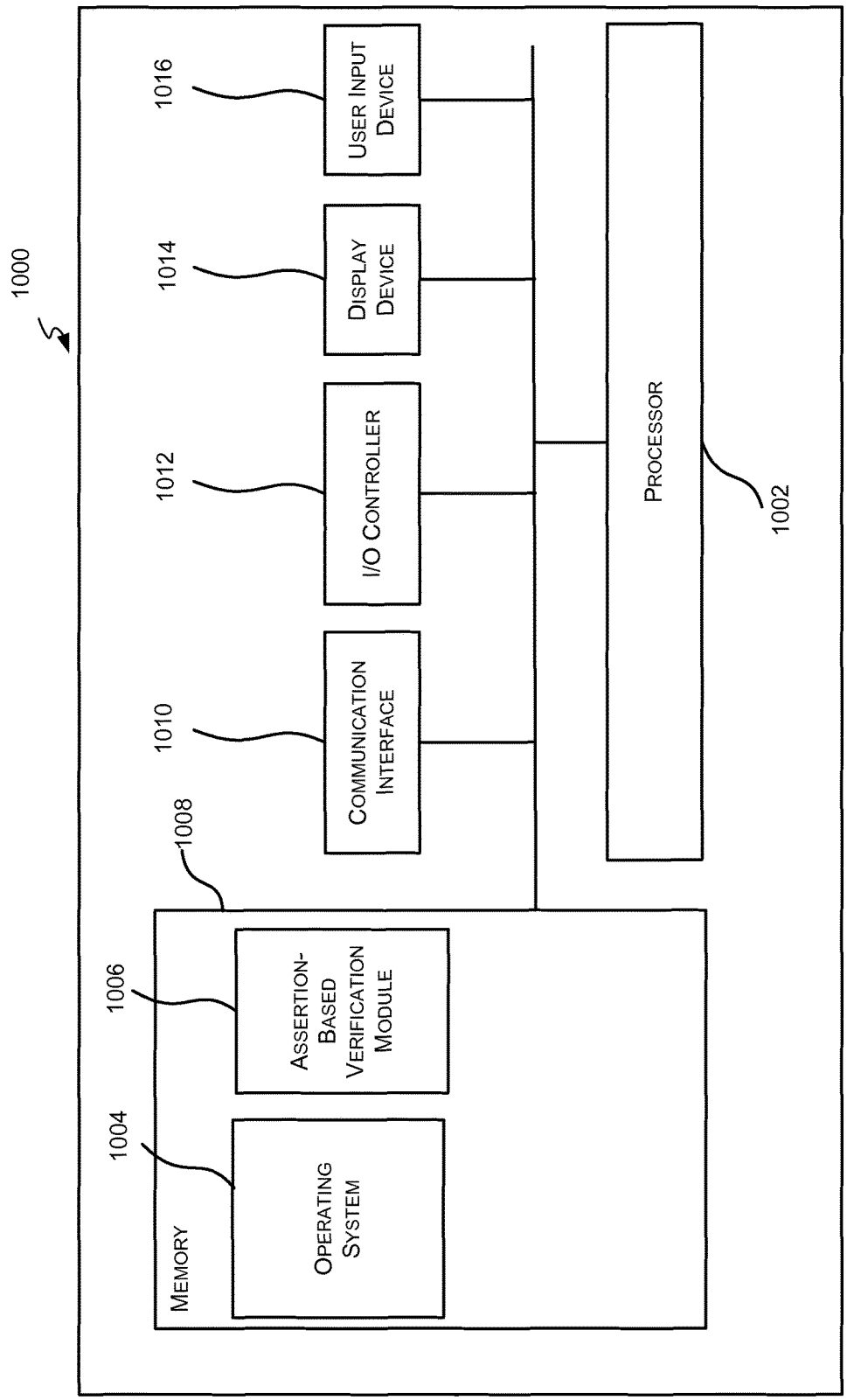
FIG. 10 is a block diagram of an example computing-based device.

FIG. 10 illustrates various components of an exemplary computing-based device 1000 which may be implemented as any form of a computing and/or electronic device, and in which embodiments of the systems and methods described above for verifying a derived clock using assertion-based verification may be implemented.

Computing-based device 1000 comprises one or more processors 1002 which may be microprocessors, controllers or any other suitable type of processors for processing computer executable instructions to control the operation of the device in order to detect deadlock in a hardware design. In some examples, for example where a system on a chip architecture is used, the processors 1002 may include one or more fixed function blocks (also referred to as accelerators) which implement a part of the method of detecting deadlock in hardware (rather than software or firmware). Platform software comprising an operating system 804 or any other suitable platform software may be provided at the computing-based device to enable application software 1006, such as assertion-based verification software to be executed on the device.

The computer executable instructions may be provided using any computer-readable media that is accessible by computing based device 1000. Computer-readable media may include, for example, computer storage media such as memory 1008 and communications media. Computer storage media (i.e. non-transitory machine readable media), such as memory 808, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1008) is shown within the computing-based device 800 it will be appreciated that the storage may be distributed or located remotely and accessed via a network or other communication link (e.g. using communication interface 810).

The computing-based device 1000 also comprises an input/output controller 1012 arranged to output display information to a display device 1014 which may be separate from or integral to the computing-based device 1000. The display information may provide a graphical user interface. The input/output controller 1012 is also arranged to receive and process input from one or more devices, such as a user input device 1016 (e.g. a mouse or a keyboard). This user input may be used to control the operation of the deadlock detection. In an embodiment the display device 1014 may also act as the user input device 1016 if it is a touch sensitive display device. The input/output controller 1012 may also output data to devices other than the display device, e.g. a locally connected printing device (not shown in FIG. 10).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program.

Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to detect deadlock in a hardware design, comprising:
   identifying, in a processor, one or more key control signals in the hardware design, each key control signal enabling or blocking an action from happening;
   generating, in a processor, a state machine for each identified key control signal to track the state of that key control signal;
   generating, in a processor, one or more assertions for each identified key control signal to detect whether that key control signal is in a deadlock state based on data from the state machine for that key control signal, each of the one or more assertions for each identified key control signal defined in an assertion language; and
   determining, in a processor, whether the hardware design can enter a deadlock state by detecting, through formal verification or simulation based verification of the one or more assertions for each identified key control signal in conjunction with said state machines, whether any of the identified key control signals can enter a deadlock state further comprising, in response to determining the hardware design can enter a deadlock state, outputting an indication of the detected deadlock state and updating the hardware design based on the outputted indication.

2. The method of claim 1, wherein formal verification of the one or more assertions for each identified key control signal comprises using a formal verification tool to search an entire reachable state space of the hardware design to determine whether there is a state in which any of the one or more assertions for the identified key control signals is not valid.

3. The method of claim 1, wherein simulation based verification of the one or more assertions for each identified key control signal comprises:
   applying stimuli to the hardware design;
   tracking, using the state machines, the state of the identified key control signals in response to the stimuli; and
   evaluating the one or more assertions for each identified key control signal to determine whether any of the identified key control signals have entered a deadlock state.

4. The method of claim 1, wherein the one or more assertions for each identified key control signal are verified under one or more fairness constraints, each fairness constraint ensuring certain behavior takes place on one or more inputs of the hardware design to allow a valid sequence of state transformations and interactions to take place during simulation based verification or formal verification of an assertion.

5. The method of claim 1, wherein identifying the one or more key control signals comprises obtaining a configuration file that comprises a list of the one or more key control signals.

6. The method of claim 1, wherein identifying the one or more key control signals comprises extracting the one or more key control signals from the hardware design.

7. The method of claim 1, wherein at least one of the one or more assertions asserts that if a particular control signal is not true then sometime in the future the particular control signal will be true.

8. The method of claim 1, wherein at least one of the one or more assertions asserts that if a particular control signal falls then sometime in the future the particular control signal will rise.

9. The method of claim 1, wherein the hardware design is a high level language description of a System on Chip.

10. A system to detect deadlock in a hardware design, the system comprising:
one or more state machines, each state machine configured to track the state of a key control signal in the hardware design, each key control signal enabling or blocking an action from happening;
an assertion verification unit in communication with the one or more state machines, the assertion verification unit configured to use one or more assertions to analyze the one or more state machines to determine whether any of the key control signals is in a deadlock state, each of the one or more assertions defined in an assertion language; and
a test bench configured to determine whether the hardware design can enter a deadlock state by detecting, through formal verification or simulation based verification of the one or more assertions via the assertion verification unit, whether any of the key control signals can enter a deadlock state wherein the test bench is further configured to, in response to determining the hardware design can enter a deadlock state, output an indication of the detected deadlock state whereby the hardware design is updated based on the outputted indication.

11. The system of claim 10, wherein formal verification of the one or more assertions comprises using a formal verification tool to search an entire reachable state space of the hardware design to determine whether there is a state in which any of the one or more assertions is not valid.

12. The system of claim 10, wherein simulation based verification of the one or more assertions comprises:
applying stimuli to the hardware design;
tracking, using the state machines, the state of the key control signals in response to the stimuli; and
evaluating the one or more assertions to determine whether any of the key control signals have entered a deadlock state.

13. The system of claim 10, wherein the assertion verification unit is configured to evaluate the one or more assertions under one or more fairness constraints, each fairness constraint ensuring certain behavior takes place on one or more inputs of the hardware design to allow a valid sequence of state transformations and interactions to take place during simulation based verification or formal verification of an assertion.

14. The system of claim 10, wherein at least one of the one or more assertions asserts that if a particular control signal is not true then sometime in the future the particular control signal will be true.

15. The system of claim 10, wherein at least one of the one or more assertions asserts that if a particular control signal falls then sometime in the future the particular control signal will rise.

16. The system of claim 10, wherein each of the one or more state machines comprises:
a register; and
a logic unit in communication with the register, the logic unit configured to periodically identify the state of the key control signal and store the identified state in the register.

17. The system of claim 10, wherein the hardware design is a high level language description of a System on Chip.

18. A non-transitory computer readable storage medium having stored thereon computer executable program code that when executed causes at least one processor to:
identify one or more key control signals in a hardware design, each key control signal enabling or blocking an action from happening;
generate a state machine for each identified key control signal to track the state of that key control signal;
generate one or more assertions for each identified key control signal to detect whether that key control signal is in a deadlock state based on data from the state machine for that key control signal, each of the one or more assertions for each identified key control signal defined in an assertion language; and
determine whether the hardware design can enter a deadlock state by detecting, through formal verification or simulation based verification of the one or more assertions for each identified key control signal in conjunction with said state machines, whether any of the identified key control signals can enter a deadlock state; and
in response to determining the hardware design can enter a deadlock state, outputting an indication of the detected deadlock state and updating the hardware design based on the outputted indication.

19. A verification system to detect an error in a hardware design, the system comprising:
one or more state machines, each state machine configured to track the state of a key control signal in the hardware design, each key control signal enabling or blocking an action from happening;
an assertion verification unit in communication with the one or more state machines, the assertion verification unit configured to use one or more assertions to analyze the one or more state machines to determine whether any of the key control signals is indicative of the error, each of the one or more assertions defined in an assertion language; and
a test bench configured to determine whether the error is present in the hardware design by detecting any of the key control signals which are indicative of the error through formal verification or simulation based verification of the one or more assertions via the assertion verification unit, wherein the test bench is further configured to, in response to determining that an error is present in the hardware design, output an indication of the detected error whereby the hardware design is updated based on the outputted indication.

* * * * *